Sept. 27, 1938.  M. O. SNEDIKER  2,131,573
RECORDING THERMOMETER
Filed Nov. 9, 1936
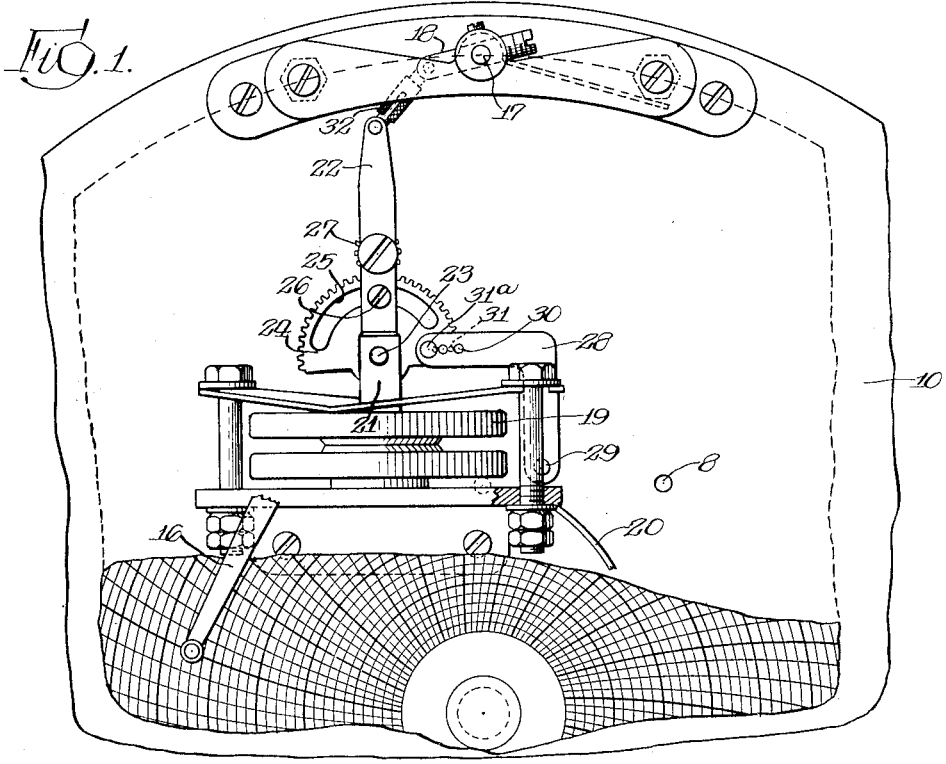
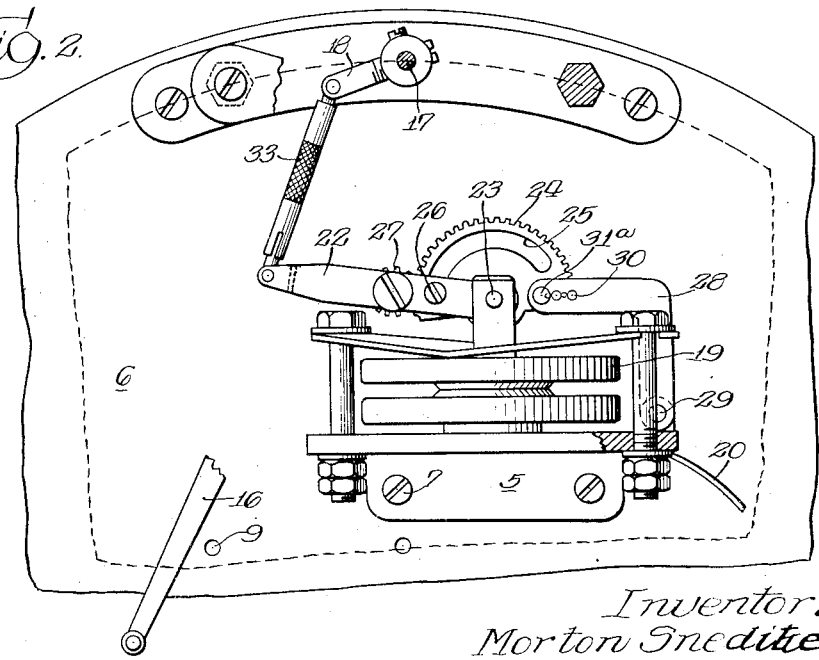
Inventor:
Morton Snediker.
By Thussey + Thussey Atty's.

Patented Sept. 27, 1938

2,131,573

UNITED STATES PATENT OFFICE 2,131,573

RECORDING THERMOMETER

Morton O. Snediker, Chicago, Ill., assignor to The Powers Regulator Company, Chicago, Ill., a corporation of Illinois Application November 9, 1936, Serial No. 109,926

2 Claims. (Cl. 234—72)

My invention relates to recording instruments and particularly to novel compensating means for use in connection with recording thermometers. A construction similar to that herein described and claimed was first disclosed in my copending application Serial No. 33,649, filed July 29, 1935.

It is well known that volatile liquids expand on the application of heat in cumulative ratio; that is, the pressure developed on the application of heat is not in direct proportion to the temperature increase. This has necessitated the provision in the charts for recording thermometers, of circular division lines of gradual increasing width as higher temperatures are indicated (or recorded). Thus at a point near the center, the lines would be relatively closely spaced, making reading of the chart difficult and the results inaccurate.

Numerous expedients have been adopted for compensating for the increasing pressure of the thermostatic liquid, but as far as I am aware, no mechanism has been proposed in which the same instrument is adapted for operation in connection with different thermostatic liquids or in which the range as recorded on the chart might be changed. By "range" I mean as follows:

Where the necessity for close indications is not essential, a chart may be used where the range between the circular division lines may include 25 degrees of temperature change; that is, 5 degrees between each of the light division lines. Obviously this does not provide for close regulation or indication. In other cases where close regulation is necessary, it may be found desirable to provide for only 5 degrees between the main division lines; that is, one degree for each of the intermediate division lines. The compensating mechanism here disclosed is so arranged that the same instrument may be used for either of the two extreme conditions, merely by adjustment of the compensating mechanism. This is an advantage, not only to the manufacturer, who may standardize his parts, but to the user, who may wish to change the instrument from one to the other condition. The mechanism also provides for accurate compensation in any of the different ranges.

My invention will be more readily understood by reference to the accompanying drawing; in which, Fig. 1 is a front elevation of apparatus constructed in accordance with my invention; and, Fig. 2 illustrates the same mechanism, with a change in a link used therein and a change of position of the actuating unit, the adjustment being such as to provide for the maximum range of movement.

In the drawing I have illustrated a part of the dial 10 of a recording thermometer, a shaft 11 and a chart clamp 12 being added as essential elements of a recording instrument. A chart 13 having main division lines 14 and intermediate lines 15 is shown in place. A pen arm 16 is provided which is mounted on a pivot 17 having a crank 18, the pen arm operating in the usual manner. The crank is adjustable as to length, it being screw threaded through the sleeve that carries the pen arm pivot 17.

A bellows 19 is fixed to the instrument, the bellows being adapted to be influenced by pressure developed by a volatile liquid in a bulb, not shown, a tube 20 providing communication between the bulb and bellows. The upper wall of the bellows is movable, the movement thereof being transmitted through a projection 21. Pivoted to the projection is a range control bar 22, the pivot 23 thereof also providing a support for a gear sector 24 having an arcuate slot 25 therein. A set screw 26 serves to connect the bar 22 to the gear sector and to firmly hold those parts against movement, except when adjustment is to be made. A pinion 27, is carried on a headed shaft mounted on the bar, the pinion engaging the gear 24. A slot in the said head enables the use of a screw driver for turning the pinion and thereby effecting a very fine adjustment between the bar and the gear sector.

While I have shown a gear sector for the described purpose, yet the function of this part is merely that of an arm projecting substantially transversely of the line of movement of the bellows end wall. In the position of Fig. 1 the arm and bar constitute in effect a bell crank, while in the position of Fig. 2 the parts are arranged so that the bar is in effect a motion multiplying lever.

The fulcrum for the arm, which is the term that will be used in referring to the part 24, consists of a link 28 mounted on a fixed pivot 29 at one end and at the other end having a series of holes 30, preferably spaced ⅛ inch apart. The sector or arm also has three or more holes 31, preferably spaced 5/64 inch apart. By the use of the connecting pin 31a, it will be seen that by proper selection of the holes a very close adjustment may be secured, this being the means for bringing about the compensating action of the mechanism, and the adjustment serving to adapt the instrument to all of the ordinary volatile liquids that are used for regulating purposes.

The range of movement of the pen arm is determined by the degree of angularity of the bar 22 from a vertical position as shown in Fig. 1 and by the length of the crank 18. In the position of Fig. 1 an adjustable link 32 connects the upper end of the bar to the crank 18 and it will be seen that the upward bodily movement of the bellows is transmitted in a direct vertical line through the bar to the shortened crank 18. However, as the fulcrum point of the arm 24, represented by the pin 31a, is fixed, the arm will not rise, but will rotate and thereby cause the bar to swing to the right as viewed in Fig. 1, thus tending to straighten out the line between the pivot 23 and the end of the crank 18. This insures the correct compensation for short range control with the parts disposed as shown.

However, if wide range control is desired, for example where each of the circles 15 represent one degree of temperature change, then the bar 22 is swung to the extreme position shown in Fig. 2 and a longer link 33 is provided to connect the end of the bar to the crank. Thus the bar 22, together with the arm 24 becomes a motion multiplying lever and for any unit of movement of the bellows, the movement of the pen arm is increased to the extent of the motion multiplication as between the pivot points 23 and 31a. The degree of multiplication is determined by the position of the pin 31a and the angular position of the arm 22.

In order to adapt the operating mechanism to the longer link 33, it is desirable to change the bodily position of the operating unit relative to the shaft 17 that carries the pin arm. Consequently the unit which is supported on the bracket 5 and held in position against the back plate 6 of the instrument by the screws 7 is shifted to the position shown in Figure 2 in which the screws 7 engage the holes 8 in the plate rather than the holes 9 shown in Fig. 2. In the position of Fig. 2, the widest range of pin arm movement is secured and in Fig. 1 the narrowest range within practical limits.

While I have shown only an extreme position in Fig. 2, it will be understood that the instrument may be adjusted to accommodate any desired range between the limits indicated. Also that modifications may be made in the construction without departure from the spirit of my invention.

I claim:

1. In compensating means for recording instruments, the combination of a thermo-responsive element having a movable part, a bar bodily movable with the part and pivoted thereon, an arm fixed to said bar and angularly adjustable about the pivot of the bar, a link mounted at one end on a fixed pivot and at the other end connected to the arm and providing a fulcrum point therefor, a pen arm shaft and a crank thereon, and a link connecting the crank to the free end of the bar.

2. In a recording instrument, the combination with a thermo-responsive element having a movable part, a bar pivoted on said part and bodily movable therewith, an arm projecting transversely of the line of movement of said part, said arm being fixed to the bar with capacity for angular adjustment relative thereto, said arm being in the form of a gear sector and said bar carrying a pinion for engagement therewith, a link mounted on a fixed pivot at one end and at the other end connected to the free end of said arm and providing a fulcrum therefor, a pen arm shaft and a crank thereon and a link connecting the crank to the upper end of said bar.

MORTON O. SNEDIKER.